Figure 1:
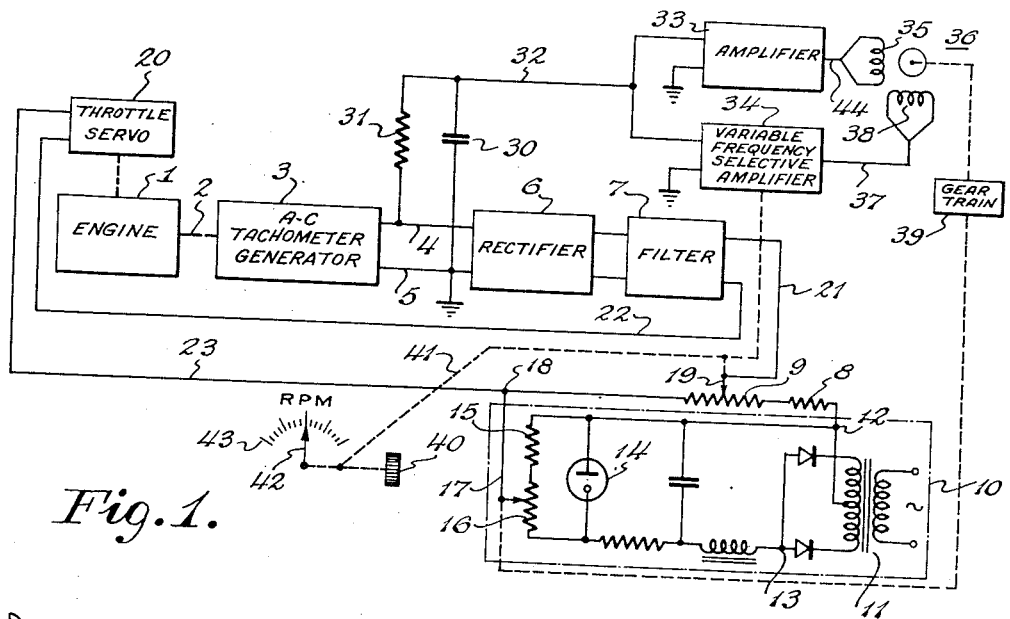

Oct. 23, 1956  V. C. CETRONE  2,768,331
FAIL-SAFE SPEED CONTROL SYSTEM
Filed June 21, 1954

INVENTOR
VINCENT C. CETRONE
BY
ATTORNEY

United States Patent Office 2,768,331
Patented Oct. 23, 1956

2,768,331

FAIL-SAFE SPEED CONTROL SYSTEM

Vincent C. Cetrone, Glen Head, N. Y., assignor to Sperry Rand Corporation, a corporation of Delaware Application June 21, 1954, Serial No. 438,290

6 Claims. (Cl. 317—5)

This invention relates to control systems for controlling the speed of motive power means. More particularly, the invention concerns a speed control system of this nature employing a speed signal frequency comparison control arrangement in novel combination for fail-safe operation with a speed signal amplitude comparison control arrangement.

In controlling the speed of a motive power means, such as, for example, the R. P. M. of a gas turbine, an actual-speed signal is generally obtained from a signal generating device driven by the motive power means. The actual speed signal is then compared frequency-wise or amplitude-wise with a reference signal representing a given speed. And the difference, if any, is employed to actuate a speed controller, such as a servo-operated fuel regulator, so as to eliminate such difference and maintain the motive power means at the given speed.

Frequency comparison systems are noted for their exceptional accuracy, but their reliability is often deficient due to their electronic nature requiring extensive use of vacuum tubes subject to numerous operating failures. On the other hand, amplitude comparison systems are noted for their exceptional reliability, but their accuracy is often deficient due, for example, to unpredictable variations in the signal outputs obtained for given speeds of the signal generating device providing the actual-speed signal.

In order to secure the advantages of both of the foregoing systems in one system, a novel combination of the two systems is effected by the present invention. By this arrangement, speed control by the two systems is normally concurrent in a fine-coarse sense; and in the event of a failure of the frequency comparison portion of the combined systems, speed control is nevertheless retained by the amplitude comparison portion.

An object of the present invention, therefore, is to provide a novel fail-safe speed control system for a motive power means.

Another object is the provision of a novel speed control system employing signal amplitude comparison and signal frequency comparison control arrangements in a concurrent control sense.

Another object is to provide a novel speed control system for a motive power means wherein the system is simultaneously responsive control-wise to departures from given values of the frequency and amplitude of an A. C. signal which is dependent on the speed of the motive power means.

Another object is the provision of a novel speed control means responsive to the phase difference between an A. C. tachometer-derived voltage of substantially unvarying phase and peak amplitude and the output of a frequency-selective device to which the tachometer voltage is fed for shifting its phase in dependence upon departures of its frequency from the selected frequency.

Figure 2:
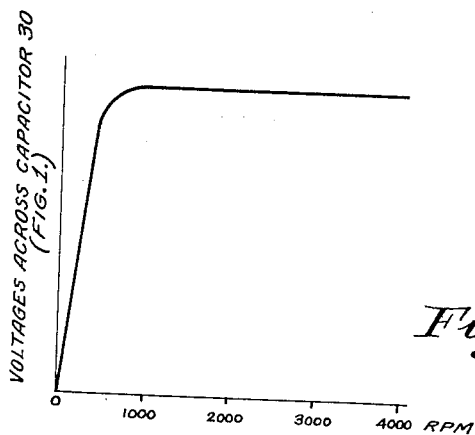
Figure 3:
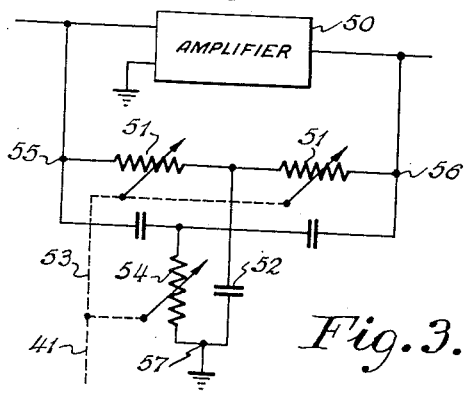
Figure 4:
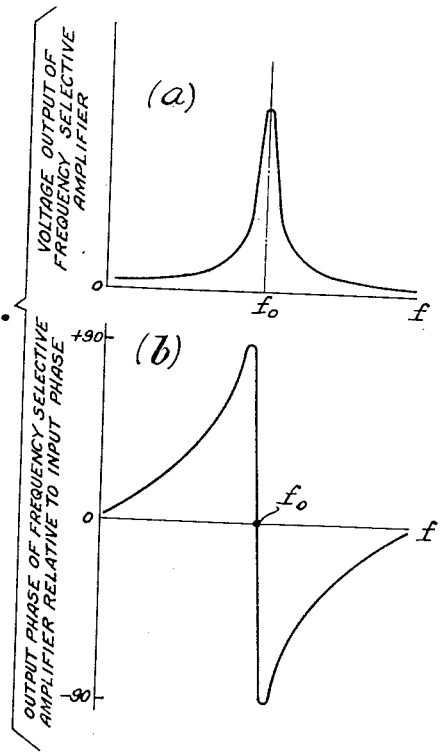

Other objects and features of the invention will appear more fully from an understanding of the operation of the embodiments illustrated in the drawings, in which:

Fig. 1 is a schematic diagram of a preferred embodiment of the present invention;

Fig. 2 is a graphical representation of the voltage component developed across capacitor 30 in Fig. 1 with respect to engine R. P. M.;

Fig. 3 is a schematic diagram of a frequency-selective amplifier suitable for use in Fig. 1; and Fig. 4 is a two-part graphical representation of the amplitude and phase of the output of the amplifier of Fig. 3 with respect to the tachometer generator frequency.

Referring to Fig. 1 the motive power means, which may be an engine 1, is adapted through a suitable mechanical connection 2 to drive a conventional A. C. tachometer generator 3 which furnishes an alternating current output across its output leads 4, 5 having a frequency and amplitude dependent on the speed at which the tachometer is driven. This output is rectified by a conventional rectifier device 6 having its input connected to leads 4, 5 and is filtered by a suitable filter 7 connected to the rectifier device and having output leads 21, 22.

The tachometer-derived actual-speed signal, as rectified and filtered, is connected via leads 22, 23, 21 in series with a conventional throttle servo 20 and a selected portion of a reference voltage placed across a serially-connected fixed resistor 8 and a potentiometer 9 having a wiper 19 by a conventional voltage regulated power supply 10. For illustrative purposes, regulated supply 10 is shown in Fig. 1 as including a suitable source of alternating current connected to energize the primary winding of a transformer 11 having a secondary winding, a center-tap of which is connected to one terminal 12 of the series-connected potentiometer and resistor 8, 9 and the end taps of which are connected to a common terminal 13. A conventional voltage regulator tube 14 which may, for example, be of the glow tube variety, is connected across terminal 12 and via an appropriate filter resistor and choke to terminal 13. A serially-connected fixed resistor 15 and potentiometer 16 having a wiper 17 are connected across the output of regulator 14, and wiper 17 is connected to the other terminal 18 of series resistance combination 8, 9. Rectifier 6 is so poled with respect to the rectifier elements of regulator 10 that the polarity of the portion of the regulated voltage across terminals 12, 18 that is serially-connected with the tachometer voltage is opposite to the polarity of said tachometer voltage. Hence, the tachometer voltage and the regulated voltage portion are differentially combined so that throttle servo 20 receives a control signal input of a magnitude equal to the voltage difference, if any. The polarity of the control signal, hence the sense in which the throttle of engine 1 is actuated depends on which of the differential voltages is the greater. Accordingly, engine 1 is controlled to speed up or slow down as required to reduce the control signal to zero, at which time the engine is maintained at a speed corresponding to the setting of wiper 19.

Besides being controlled in speed by an amplitude responsive arrangement, engine 1 is concurrently controlled in speed by a frequency responsive arrangement. In this connection a serially-connected capacitor 30 and resistor 31 are connected across tachometer output leads 4, 5, and the voltage across capacitor 30 is fed via a lead 32 and ground to the inputs respectively of a conventional amplifier 33 and a variable frequency-selective amplifier 34 which may be of the type, for example, shown in Fig. 3, later to be described in detail. Capacitor 30 and resistor 31 are so related to each other and the output frequencies produced respectively for given speeds of tachometer 3 that the capacitor voltage supply to the inputs of amplifiers 33, 34 is of substantially unvarying amplitude over the speed range through which control is desired. Fig. 2 shows by way of example a graphic representation of the characteristic that may be obtained for the capacitor voltage related to tachometer frequency (or engine R. P. M.). The capacitor voltage may be made to attain its asymptotic or substantially unvarying amplitude value sooner than is shown in Fig. 2 simply by choosing a tachometer generator of increased output frequency over the speed range to be controlled.

The capacitor voltage is amplified by amplifier 33 with substantially no phase shift and is fed on the cable 44 to energize one winding 35 of a conventional two-phase servomotor 36. Amplifier 34 on the other hand is such as to produce a maximum overall transmission at the frequency for which it is adjusted. Its output characteristic in so far as amplitude is concerned is shown in curve (a) of Fig. 4 as related to frequency $f$, the adjusted or selected frequency being $f_0$. At frequency $f_0$ the output of amplifier 34 which is connected via a cable 37 to the other winding 38 of motor 36 is substantially in phase with the output of amplifier 33 so that the servomotor is not actuated. However, as soon as the frequency of the capacitor voltage departs from the selected frequency $f_0$, an immediate phase shift of substantially 90° occurs in the output of amplifier 34 in a direction depending on whether or not the frequency of the capacitor voltage has increased or decreased relative to $f_0$. See curve (b) of Fig. 4. Hence, motor winding 38 is energized out of phase with motor winding 35, thereby to actuate motor 36.

Motor 36 is adapted through suitable mechanical connections including a gear train 39 to position wiper 17 for varying the reference voltage placed across terminals 12, 18 by regulated power supply 10.

A manually adjusted knob 40 is adapted by a suitable mechanical connection 41 to position wiper 19 of potentiometer 9 and simultaneously to actuate a means within amplifier 34 for varying the frequency selection of this amplifier. The positioning of wiper 19 at any given time is correlated to the positioning of the frequency selection means in amplifier 34 so that the respective adjustments correspond to a given engine speed. Accordingly, knob 40 may also be connected as shown to actuate a pointer 42 cooperating with a dial 43 calibrated in terms of R. P. M.

By the arrangement thus far described, engine 1 is controlled to maintain a selected speed through the concurrent control of a frequency responsive arrangement and an amplitude responsive arrangement. In the event an operating failure occurs in either of amplifiers 33, 34, such as the burning out of an electron tube, speed control is still maintained by the amplitude responsive arrangement.

Fig. 3 serves to illustrate a variable-frequency selective amplifier suitable for use as amplifier 34. In brief, the amplifier consists of a conventional amplifier 50 provided with a degenerative feedback loop including a twin-T network. Specifically, the twin-T network comprises one T network of two resistors 51 and a capacitor 52 connected in parallel with another T-network comprising two capacitors 53 and a resistor 54 so as to provide three terminals 55, 56, 57, the latter terminal being common to the input and output of the twin-T network. Network input terminal 56 is connected to receive the output of amplifier 50 and network output terminal 55 is connected to the input of the amplifier. Preferably, the three resistors 51, 54 are variable and are ganged for simultaneous actuation by mechanical connection 41 (Fig. 1). As is well known in the art, the twin-T network rejects a certain frequency range depending on the relation of its resistive and capacitive parameter values. Hence, actuation of variable resistors 51, 54 serves to shift the mid-frequency value of the frequency rejection range of the network. Moreover, the band-pass range of the amplifier may be broadened or narrowed by selection of an appropriate Q value for the network. It is to be noted, however, that the twin-T network arrangement of Fig. 3 is offered for exemplary purposes only, since other frequency selective networks of well-known nature, such as a Wien-bridge and a bridged-T network may be employed for the same purpose.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A speed control system for controlling a motive power means to maintain a given speed, said system comprising an A. C. tachometer generator connected in driven relation to the motive means for providing an output of frequency and amplitude dependent on the speed of said motive means, means for providing a reference voltage substantially equal to the voltage of the tachometer output at said given speed, means responsive to the difference between said tachometer voltage and said reference voltage for controlling the speed of said motive means, and means responsive to departures in the frequency of said tachometer output from the frequency of said output at said given speed for varying said reference voltage, whereby said voltage difference responsive means and said frequency responsive means exercise concurrent control of the speed of said motive means.

2. A speed control system for controlling a motive power means to maintain a given speed, said system comprising an A. C. tachometer generator connected in driven relation to the motive means for providing an output of frequency and amplitude dependent on the speed of said motive means, means for providing a reference voltage substantially equal to the tachometer output voltage at said given speed, means for varying said reference voltage in accordance with departures in frequency of the tachometer output from the frequency thereof at said given speed, and means responsive to the difference between said tachometer output voltage and said reference voltage as varied for controlling the speed of said motive means to reduce said frequency departure and voltage difference to zero.

3. A speed control system for controlling a motive power means to maintain a given speed, said system comprising a first signal generating means for providing an electrical signal the frequency and voltage of which is dependent on the speed of said motive means, second signal generating means for providing a first reference voltage substantially equal to said speed signal voltage at said given speed, means connected to receive said speed signal voltage for deriving therefrom a second reference voltage of substantially unvarying amplitude over a predetermined range of speed including said given speed, frequency-selective means connected to receive said second reference voltage for shifting the phase thereof in its output upon departure of the frequency of said second reference voltage from its frequency at said given speed, means responsive to the difference between said speed signal voltage and said first reference voltage for controlling the speed of said motive means, and means responsive to the phase difference between said second reference voltage and the output of said frequency-selective means for varying the amplitude of said first reference voltage.

4. A speed control system for controlling a motive power means to maintain a given speed, said system comprising an A. C. tachometer generator connected in driven relation to the motive means for providing an output signal of frequency and amplitude dependent on the speed of said motive means, means for providing a first reference voltage substantially equal to the voltage output of the tachometer at said given speed, said first reference voltage providing means including signal-responsive means for varying said first reference voltage, means responsive to the difference between said tachometer output voltage and said first reference voltage for controlling the speed of said motive means, means for deriving a second reference voltage of substantially unvarying amplitude from said tachometer output signal, frequency-selective means connected to receive said second reference voltage for shifting the phase thereof upon departure of its frequency from the frequency thereof at said given speed, phase-responsive means connected to receive said second reference voltage and the output of said frequency-selective means for providing a control signal dependent on the phase difference therebetween, and means connecting said phase-responsive means to said first reference voltage varying means for varying said first reference voltage in accordance with said control signal.

5. A speed control system for controlling a motive power means to maintain a given speed, said system comprising an A. C. tachometer generator connected in driven relation to the motive means for providing an output signal of frequency and amplitude dependent on the speed of said motive means, means for providing a reference voltage substantially equal to the voltage output of the tachometer generator at said given speed, resistance-reactance divider means connected across the output of said tachometer generator, the resistance and reactance portions of said divider being so related to the output frequency of said tachometer generator with respect to the tachometer speed that a voltage component of substantially unvarying amplitude over a predetermined range of tachometer generator speed including said given speed is developed across one of said portions, frequency-selective means connected to receive said voltage component for shifting the phase thereof in its output upon departure of the frequency of said component from the value thereof at said given speed, means responsive to the difference between said reference voltage and the output voltage of said tachometer generator for controlling the speed of said motive means to reduce said voltage difference to zero, and means responsive to the phase difference between said voltage component and the output of said frequency-selective means for varying the amplitude of said reference voltage.

6. A speed control system for controlling a motive power means to maintain a given speed, said system comprising an A. C. tachometer generator connected in driven relation to the motive means for providing an output signal of frequency and amplitude dependent on the speed of said motive power means, means connected to said tachometer generator for rectifying the output thereof, means for supplying a direct-current reference voltage substantially equal to the rectified tachometer generator output at said given speed, signal-responsive means for controlling the speed of said motive means, means for connecting said rectified tachometer generator output and said reference voltage in opposed-series relation with said signal-responsive means, resistance-reactance means interposed in the connection between said tachometer and said rectifying means for providing a voltage component of substantially unvarying peak amplitude beyond a predetermined tachometer output frequency less than the frequency at said given speed, a first amplifier of substantially zero phase-shift characteristic, a second amplifier the output phase of which relative to its input phase is a function of the frequency of its input, said second amplifier being arranged to provide a zero phase shift at the tachometer output frequency corresponding to said given speed, and means responsive to the phase-difference of the outputs of said amplifiers for varying the amplitude of said reference voltage.

References Cited in the file of this patent
UNITED STATES PATENTS
2,478,279    Kochenburger _____ Aug. 9, 1949